United States Patent [19]

Rinkewich

[11] Patent Number: 4,715,543
[45] Date of Patent: Dec. 29, 1987

[54] FLOW RESTRICTOR DEVICE PARTICULARLY USEFUL FOR DRIP IRRIGATION

[76] Inventor: Isaac Rinkewich, 12 Fishman Maimon St., Tel Aviv, Israel

[21] Appl. No.: 822,876

[22] Filed: Jan. 27, 1986

[51] Int. Cl.⁴ .............................................. B05B 15/00
[52] U.S. Cl. ..................................... 239/542; 239/547
[58] Field of Search ............... 239/542, 547, 569, 572, 239/452, 451; 138/40, 45, 46

[56] References Cited

U.S. PATENT DOCUMENTS

| | | | |
|---|---|---|---|
| 3,216,451 | 11/1965 | Smallpeice | 138/46 X |
| 4,011,893 | 3/1977 | Bentley | 239/542 X |
| 4,228,956 | 10/1980 | Varner | 239/237 |
| 4,254,791 | 3/1981 | Bron | 239/542 X |

FOREIGN PATENT DOCUMENTS 2334422 12/1975 France .............................. 239/542

*Primary Examiner*—Andres Kashnikow
*Assistant Examiner*—Patrick N. Burkhart
*Attorney, Agent, or Firm*—Benjamin J. Barish

[57] ABSTRACT

A flow restrictor device particularly useful as a drip irrigation emitter, comprises a disc-shaped member attachable to a pipe containing a pressurized fluid. The disc-shaped member is formed with an annular recess in one face to be exposed to the pressurized fluid, and with a metering passageway leading from the annular recess to another face to be exposed to the atmosphere. The device further includes an annular member received within the annular recess to partially cover the metering passageway. The latter member is deformable under pressure to restrict or enlarge the metering passageway, and thereby to control the flow of the fluid therethrough, according to the pressure of the fluid at one face of the disc-shaped member.

20 Claims, 7 Drawing Figures

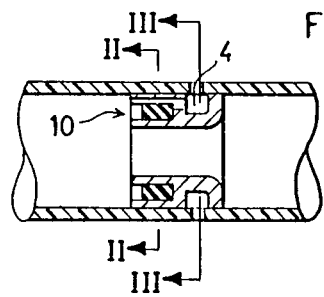 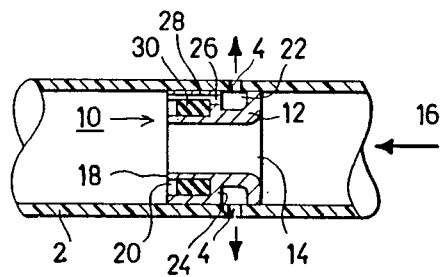
FIG 1
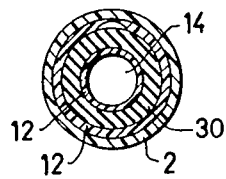 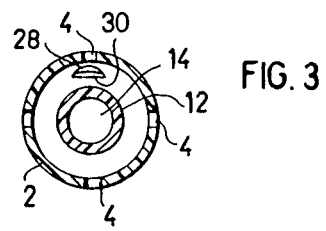
FIG.2  FIG. 3
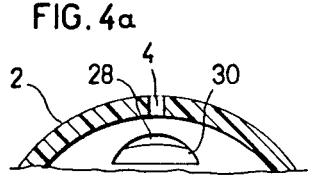 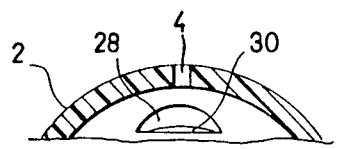
FIG. 4a  FIG 4b
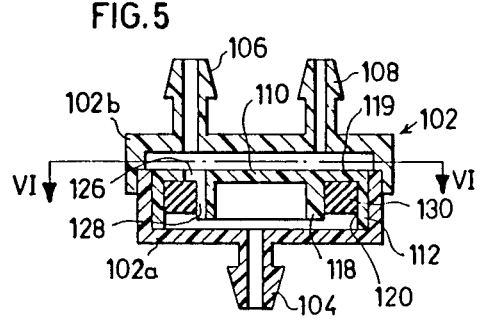 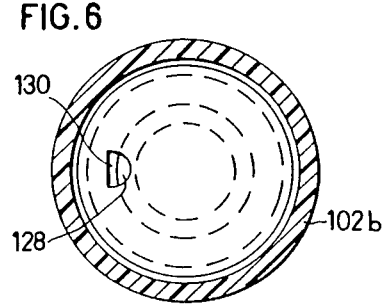
FIG.5  FIG.6

FLOW RESTRICTOR DEVICE PARTICULARLY USEFUL FOR DRIP IRRIGATION

BACKGROUND OF THE INVENTION

The present invention relates to flow restrictor devices, and particularly to such devices useful for drip irrigation.

Drip irrigation devices are gaining widespread use for feeding the irrigating water, with or without additives such as fertilizer, directly to the root region of the plants at a slow rate. Two general types of such devices are now in use. One is commonly called a point-source emitter, as it includes a single outlet opening for emitting the water; and the other is commonly called a linear-source emitter, as it includes a plurality of openings formed along the length of a pipe for emitting the water. Both types have been subject to extensive research and development work in a continuous effort to reduce the sensitivity of the emitters to clogging by solid particles in the irrigating water, to reduce the sensitivity of the emitters to variations in the pressure in the supply line, and also to reduce the cost of manufacturing and maintaining such emitters.

An object of the present invention is to provide a novel flow restrictor device particularly useful for drip irrigation and having advantages in one or more of the above respects. The invention is useful with respect to both the point-source emitters and the linear-source emitters.

BRIEF SUMMARY OF THE INVENTION

According to the present invention, there is provided a flow restrictor device particularly useful for drip irrigation, comprising: a disc-shaped member attachable to a pipe containing a pressurized fluid such that one face of the disc-shaped member is subject to the pressurized fluid, and an other face is exposed to the atmosphere. The disc-shaped member is formed with an annular recess in the one face to be exposed to the pressurized fluid, and with a metering passageway leading from the annular recess to tne other face to be exposed to the atmosphere. The device further includes a flow restrictor annular member of uniform inner and outer dimensions received within the annular recess to partially cover the metering passageway. The flow restrictor member is deformable in a radial direction under the pressure of the pressurized fluid to restrict the metering passageway under high inlet pressure, and to enlarge the metering passageway under low inlet pressure, and thereby to control the flow of the fluid therethrough, according to the pressure of the fluid at the one face of the disc-shaped member.

Preferably, the flow restrictor device annular member is a ring of elastomeric material.

In one described embodiment of the invention, the pipe is formed with an outlet opening therethrough connecting its interior to the atmosphere. The disc-shaped member has an outer diameter equal to the inner diameter of the pipe and is receivable within the pipe to cover the outlet opening. This member is formed with a large passageway extending axially therethrough to subject its opposite end faces to the pressure of the fluid in the pipe. One of the end faces constitutes the one face formed with the annular recess, and exposed to the pressurized fluid, and the outer side face constitutes the other face exposed to the atmosphere. The latter face is formed with a groove of larger cross-sectional area than the metering passageway which groove is aligned with the opening in the pipe and communicates with the one face of the disc-shaped member via the metering passageway. This embodiment is particularly useful in manufacturing linear-source emitters.

A second embodiment of the invention is described below wherein the disc-shaped member is enclosed within a housing having an internal diameter equal to the outer diameter of the disc-shaped member. The housing includes an inlet connector at one side for connection to the pipe and to expose one end face of the disc-shaped member to the fluid pressure therein. The housing an outlet opening at the opposite side to expose the opposite end face of the disc-shaped member to the atmosphere. This embodiment is particularly useful in manufacturing point-source emitters.

As will be described more particularly below, flow restrictor devices in general, and drip irrigation emitters in particular, can be constructed in accordance with the foregoing features of the invention having low sensitivity to clogging by solid particles in the fluid, e.g. irrigating water, and also having low sensitivity to pressure variations in the fluid supply line so that relatively uniform rates of output can be produced even in long lines and/or under varying ground conditions.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating a linear-source emitter constructed in accordance with the present invention;

FIGS. 2 and 3 are sectional views along lines II—II and III—III of FIG. 1;

FIGS. 4a and 4b are enlarged fragmentary views illustrating the metering passageway of the emitter of FIGS. 1-3 at high-pressure and low-pressure conditions, respectively;

FIG. 5 is a longitudinal sectional view illustrating a point-source emitter constructed in accordance with the present invention; and FIG. 6 is a sectional view along lines VI—VI of FIG. 5.

DESCRIPTION OF PREFERRED EMBODIMENTS

The Embodiment of FIGS. 1-3

FIGS. 1-3 illustrate a drip irrigation emitter of the linear-source type. The emitter comprises a pipe 2 for conducting therethrough the irrigating water under pressure, the pipe being formed with a plurality of outlet openings 4 spaced longitudinally along the length of the pipe for outletting the irrigating water at a slow rate. Pipe 2 includes a plurality of flow restrictor devices, each generally designated 10, spaced along the length of the pipe to cover the outlet openings 4 and to restrict the flow therethrough of the water to the required slow rate.

Each of the flow restrictor devices 10 comprises a disc-shaped member of cylindrical configuration formed with a large passageway 14 extending axially through the member so as to permit the irrigating water to flow for the complete length of the pipe. In the illustrated arrangement, the water flows in the direction indicated by arrow 16. One end face, namely face 18 at the trailing end of the member, is formed with an annular recess 20 extending axially of the member from face 18 for about one-half the length of the member. Each member 12 is further formed with an annular groove 22 in the cylindrical side face of the member and extending for its complete circumference. Members 12 are located within pipe 2 such that their annular grooves 22 are aligned with the outlet openings 4 in the pipe.

Annular groove 22 of each memeber 12 is formed slightly forwardly of the end of annular recess 20 so as to define a radially-extending annular wall 24 separating annular recess 20 from annular groove 22. An opening 26 is formed through wall 24 to establish communication between recess 20 and groove 22. Opening 26 is of arcuate shape, and its upper curved face is extended so as to remove a portion of the inner face of recess 20 aligned with opening 26, as shown at 28.

A ring 30 of pressure-deformable material is received within annular recess 20 of member 12. Ring 30 is preferably an elastomeric material, such as natural or synthetic rubber, having the characteristic of expanding radially when subjected to an axial pressure tending to contract it axially. Ring 30 is dimensioned so as to be snugly received within annular recess 20 and to partially overlie opening 26 in member 12 during the unstressed condition of the ring, thereby defining a passageway at a clearance 28.

Passageway 28 between the outer face of ring 30 and the inner face of recess 20, establishes communication between the pressurized water at face 18 of member 12 and annular recess 22 of the member aligned with the outlet openings 4. Since the exposed face of ring 30 is subject to the water pressure at end face 18 of member 12, this pressure will compress the ring in the axial direction, and thereby expand it in the radial direction according to the pressure at end face 18. Since annular groove 22 is in alignment with the openings 4 through the pipe, such groove will be subjected to atmospheric pressure.

Passageway 28 between the outer face of ring 30 and the respective face of annular recess 20 serves as a metering passageway controlling the flow of the water from face 18 of member 12 to the outlet openings 4 aligned with the annular groove 22 in member 12. Thus, when the pressure within the pipe is high, this pressure will contract ring 30 in the axial direction, thereby expanding it in the radial direction to decrease the cross-sectional area of passageway 28 (FIG. 4a), and thereby to lower the flow of water therethrough to the outlet openings 4 via intermediate opening 26 and annular groove 22. On the other hand, when the pressure within the pipe drops, ring 30 will expand in the axial direction, thereby contracting in the radial direction to increase the cross-sectional area of passageway 28 (FIG. 4b), and thereby to increase the water flow to the outlet openings 4 via intermediate opening 26 and annular groove 22. The illustrated arrangement thus provides low sensitivity to pressure variations within the pipe, thereby producing relatively uniform outputs under different pressure conditions.

The illustrated arrangement also permits the passageways to be constructed so as to have relatively large cross-sectional areas, and thereby low sensitivity to clogging by solid particles in the irrigating water. Moreover, since the metering passageway 28 is defined on one side by a resilient member, namely elastomeric ring 30, clogging particles lodging in this passageway may be easily flushed out.

The flow restrictor devices 10, including members 12 and the elastomeric rings 30, may be produced in volume and at low cost, and may be incorporated into tubes 2 at the time of extrusion of the tubes. The outlet openings 4 may be formed by piercing the tube after extrusion with the flow restrictor devices 10 therein. Preferably, tube 2 is formed with a circular array of outlet openings 4 (four such openings being shown in FIG. 3, for example) in alignment with annular groove 22.

The Embodiment of FIGS. 5–6

FIGS. 5 and 6 illustrate the invention embodied in a point-source emitter adapted to be connected to an outlet opening in the water supply line (not shown).

The emitter illustrated in FIGS. 5 and 6 includes a housing 102 made of two sections 102a, 102b. Section 102a is integrally formed with a connector 104 receivable within the outlet opening of a pipe or other source of pressurized fluid, and housing section 102b is formed with 2 outlet connectors 106, 108, for connection to two feeding tubes (not shown) feeding the outletted water at a slow rate to the root regions of the plants irrigated.

The point-source emitter illustrated in FIGS. 5 and 6 includes a flow restrictor device, generally designated 110, of basically the same structure as flow restrictor device 10 descrited above with respect to FIGS. 1–3. Thus, flow restrictor device 110 also includes a disc-shaped member 112 formed with an annular recess 120 at one face for receiving an elastomeric ring 130, which elastomeric ring controls the cross-sectional area of metering passageway 128 connecting face 118 of member 112, subjected to the high pressure of the water supply line, to the opposite face 119 of member 112 subjected to atmospheric pressure via the outlet connector openings 106, 108.

It will thus be seen that the face of member 112 subjected to the atmospheric pressure is its opposite end face 119, as distinguished from the FIGS. 1–3 arrangement wherein the atmospheric-pressure is applied to the cylindrical side wall of member 12 formed with the annular groove 22. In the arrangement illustrated in FIGS. 5 and 6, section 102b of the housing is spaced from end face 119 so as to provide communication to the outlet connectors 106, 108 via metering passageway 128 and the intermediate opening 126. In addition, since the opposite end face 119 of member 112 is subjected to atmospheric pressure, this member is of course not formed with an axial passageway corresponding to passageway 14 in FIGS. 1–3.

It will be appreciated that many changes may be made in the above-described embodiments of the invention. Thus, the elastomeric ring (30, 130) may be of square, round, half-round, channel, or other configuration in cross-section. In addition, this ring (30, 130) may be integrally formed with its disc-shaped member (12, 112), both of elastomeric or other pressure-deformable material.

Many other variations, modifications and applications of the invention may be made.

What is claimed is:

1. A flow restrictor device particularly useful for drip irrigation, comprising:
   a disc-shaped member attachable to a pipe containing a pressurized fluid such that one face of the disc-shaped member is subject to the inlet pressure of the pressurized fluid, and an other face is exposed to the atmosphere;

said disc-shaped member being formed with an annular recess in said one face to be exposed to said pressurized fluid, and with a metering passageway leading from said annular recess to said other face to be exposed to the atmosphere;

and a flow restrictor annular member of uniform inner and outer dimensions received within said annular recess to partially cover said metering passageway, said flow restrictor member being deformable in a radial direction under the pressure of the pressurized fluid to restrict said metering passageway under high inlet pressure, and to enlarge said metering passageway under low inlet pressure, and thereby to control the flow of the fluid therethrough, according to the pressure of the fluid at said one face of the disc-shaped member.

2. The device according to claim 1, wherein said disc-shaped member is a ring of elastomeric material.

3. The device according to claim 1, wherein said metering passageway is connected to said other face of the disc-shaped member by a connecting opening of larger cross-sectional area than that of said metering passageway.

4. The device according to claim 1, wherein said pipe is formed with an outlet opening therethrough connecting its interior to the atmosphere;

said disc-shaped member having an outer diameter equal to the inner diameter of the pipe and being receivable within the pipe to cover said outlet opening;

said disc-shaped member being formed with a large passageway extending axially therethrough to subject its opposite end faces to the pressure of the fluid in the pipe;

one of said end faces constituting said one face formed with said annular recess, and the outer side face constituting said other face and being formed with a groove of larger cross-sectional area than said metering passageway aligned with said opening in the pipe and communicating with said one face of the disc-shaped member via said metering passageway.

5. The device according to claim 4, wherein said groove is of annular configuration and is formed around the circumference of the side face of the disc-shaped member.

6. The device according to claim 5, wherein said pipe is formed with a plurality of said outlet openings all aligned with said annular groove.

7. The device according to claim 4, wherein said pipe is formed with a plurality of outlet openings longitudinally-spaced along its length, said device including a plurality of said disc-shaped members each received in the pipe to cover one of said openings.

8. The device according to claim 1, wherein said disc-shaped member is enclosed within a housing having an internal diameter equal to the outer diameter of the disc-shaped member;

said housing including an inlet connector at one side for connection to the pipe and to expose one end face of the disc-shaped member to the fluid pressure therein;

said housing having an outlet opening at the opposite side to expose the opposite end face of the disc-shaped member to the atmosphere.

9. The device according to claim 8, wherein said housing is formed of two sections attachable together to enclose the disc-shaped member therein;

one of said sections being formed with said inlet connector and receiving said disc-shaped member;

the other of said sections being formed with said outlet opening and being spaced from said opposite face of the disc-shaped member.

10. The device according to claim 9, wherein said outlet opening in said other housing section includes a connector connectible to a feeding tube.

11. The device according to claim 10, wherein said other housing section is formed with a plurality of outlet connectors each connectible to a feeding tube.

12. A flow restrictor device particularly useful for drip irrigation, comprising:

a pipe for a pressurized fluid and formed with an outlet opening therethrough connecting its interior to the atmosphere;

a disc-shaped member having an outer diameter equal to the inner diameter of the pipe and being receivable within the pipe to cover said outlet opening;

said disc-shaped member being formed with a large passageway extending axially therethrough to subject its opposite end faces to the pressure of the fluid in the pipe;

said disc-shaped member being formed with an annular recess in one end face to be exposed to said pressurized fluid, and with a metering passageway leading from said annular recess to the other outer side face of said disc-shaped member;

said outer side face being formed with a groove of larger cross-sectional area than said metering passageway aligned with said opening in the pipe and communicating with said one end face of the disc-shaped member via said metering passageway;

and a ring of elastomeric material received within said annular recess to partially cover said metering passageway, said ring being formable in a radial direction under pressure to restrict said metering passageway under high inlet pressure, and to enclose said metering passageway under low inlet pressure, and thereby to control the flow of the fluid therethrough, according to the pressure of the fluid at said one face of the disc-shaped member.

13. The device according to claim 12, wherein said metering passageway is connected to said outer face of the disc-shaped member by a connecting opening of larger cross-sectional area than that of said metering passageway.

14. The device according to claim 12, wherein said groove is of annular configuration and is formed around the circumference of the outer side face of the disc-shaped member.

15. The device according to claim 14, wherein said pipe is formed with a plurality of said outlet openings all aligned with said annular groove.

16. The device according to claim 12, wherein said pipe is formed with a plurality of outlet openings longitudinally-spaced along its length, said device including a plurality of of said disc-shaped members each received in the pipe to cover one of said openings.

17. A flow restrictor device particularly useful for drip irrigation, comprising:

a housing;

a disc-shaped member enclosed within said housing and having an outer diameter equal to the inner diameter of the housing;

said housing including an inlet connector at one side for connection to a pipe for a pressurized fluid and to expose one end face of the disc-shaped member to the fluid pressure therein;

said housing having an outlet opening at the opposite side to expose the opposite end face of the disc-shaped member to the atmosphere;

said disc-shaped member being formed with an annular recess in said one end face to be exposed to said pressurized fluid, and with a metering passageway leading from said annular recess to said opposite face to be exposed to the atmosphere;

and a ring of elastomeric material received within said annular recess to partially cover said metering passageway, said ring being deformable under prepssure to restrict said metering passageway under high inlet pressure, and to enlarge said metering passageway under low inlet pressure, and thereby to control the flow of the fluid therethrough, according to the pressure of the fluid at said one end face of the disc-shaped member.

18. The device according to claim 17, wherein said housing is formed of two sections attachable together to enclose the disc-shaped member therein;
one of said sections being formed with said inlet connector and receiving said disc-shaped member;
the other of said sections being formed with said outlet opening and being spaced from said opposite end face of the disc-shaped member.

19. The device according to claim 18, wherein said outlet opening in said other housing section includes a connector connectible to a feeding tube.

20. The device according to claim 19, wherein said other housing section is formed with a plurality of outlet connectors each connectible to a feeding tube.

* * * * *

UNITED STATES PATENT AND TRADEMARK OFFICE
CERTIFICATE OF CORRECTION

PATENT NO. : 4,715,543

DATED : December 29, 1987

INVENTOR(S) : Isaac Rinkewich

It is certified that error appears in the above-identified patent and that said Letters Patent is hereby corrected as shown below:

Column 4, line 28, change "descrited" to -- described --

Column 6, line 39, in Claim 12, change "formable" to -- deformable --

Column 7, line 16, in Claim 17, change "prepssure" to -- pressure --

Signed and Sealed this

Sixteenth Day of August, 1988

Attest:

DONALD J. QUIGG

*Attesting Officer*  *Commissioner of Patents and Trademarks*